Sept. 18, 1962 P. E. NAPOLITANO 3,054,422
FLUID SEAL FOR PRESSURE RESPONSIVE VALVE
Filed Sept. 26, 1958
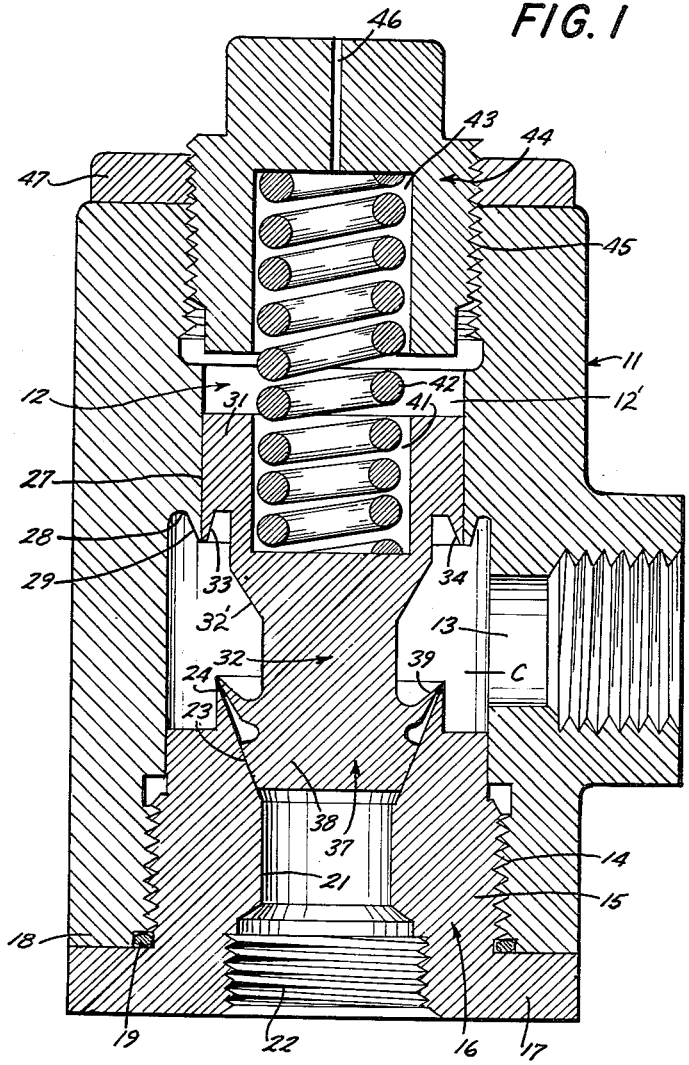
FIG. 1
FIG. 2
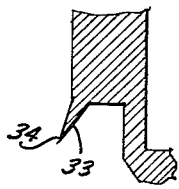
INVENTOR.
PELLEGRINO E. NAPOLITANO
BY,
ATTORNEYS.

United States Patent Office 3,054,422
Patented Sept. 18, 1962

3,054,422
FLUID SEAL FOR PRESSURE RESPONSIVE VALVE
Pellegrino E. Napolitano, 1415 57th St., Brooklyn, N.Y.
Filed Sept. 26, 1958, Ser. No. 763,598
6 Claims. (Cl. 137—509)

This invention relates to the art of fluid seals, more particularly to a fluid seal for a valve.

As conducive to an understanding of the invention it is noted that where the valve seat and the valve head adapted to engage the latter are of rigid non-yielding material, to provide a dependable seal, the engaging surfaces must be formed with extremely close tolerances, which is an expensive and difficult procedure, and even with such close tolerances, at high pressures, leakages may occur where there is no continuous sealing engagement between the valve seat and the valve head.

Where to overcome the problems of such extreme tolerances, a resilient member such as a rubber washer or gasket is formed on either the valve seat or the valve head, subjection of the valve to high temperatures is likely to cause breakdown of such gasket or washer with resultant leakage, and such breakdown will also occur where the resilient members are subjected to extreme pressures, due to structural failure of the resilient members.

Where the valve seat and the valve head are of rigid non-yielding material, even if initially lapped so that they form a perfect seal, which as previously noted is expensive and in many cases impossible to form, where the valve is subjected to extremely high temperatures as in the case of its use in guided missiles and on jet engines, for example, the resultant expansion of the metals may cause slight deformation of the valve seat and the valve head with consequent leakage therebetween especially when high pressures are involved. Furthermore, even if the valve seat and valve head initially form a dependable seal, the flow of fluid therebetween may cause wearing of one or both of the engaging surfaces with resultant leakage therebetween when the valve is in closed position.

It is accordingly among the objects of the invention to provide a seal that is independent of temperature and pressure and more particularly, to provide a valve which has a closure portion including a seat and a movable valve head that may readily be formed at relatively low cost without need of precise tolerances in its manufacture, which is devoid of material not capable of withstanding high temperatures and pressures, and which will provide a dependable and effective seal regardless of high temperatures which may cause expansion and deformation of the valve seat and valve head, and regardless of slight wear due to flow of fluid therebetween, and which valve closure is effective whether used at low or high pressures.

According to the invention, the valve closure comprises a valve seat which has a relatively thin annular portion protruding from the main body thereof, and a valve head adapted to engage the seat, the valve head having a thin annular portion protruding beyond the main portion of the head thereof and adapted initially to engage the annular portion of the valve seat.

More particularly according to one embodiment of the invention the main body of the valve seat and the inner surface of the thin annular portion protruding therefrom are formed with a uniform internal cone angle and the sealing surface of the valve head is formed with a compound angle, such that the thin annular protruding portion thereof has a larger angle than the cone angle of the seat and the remaining portion of the valve head.

According to another embodiment of the invention a seal is formed by having a thin annular flange positioned so that its free edge is in engagement with a cylindrical surface, said flange being normally inclined so that an acute angle is formed on one side with respect to the member from which it extends and an obtuse angle on the other side and the surface of the flange adjacent the acute angle is subjected to a high pressure in operation of the unit and the other surface is subjected to a lower pressure.

In the accompanying drawings in which are shown one or more of various possible embodiments of the several features of the invention, FIG. 1 is a longitudinal sectional view of a valve according to the invention, and, FIG. 2 is a detailed sectional view of the sliding seal flange prior to insertion into the unit.

Referring now to the drawings, the valve comprises a casing 11 having a longitudinal bore 12 therethrough and a transverse bore 13 leading into the longitudinal bore.

One end of bore 12 is internally threaded as at 14 to receive the correspondingly threaded portion 15 of a plug 16. The plug has an annular flange 17 at its outer end adapted to abut against the end 18 of the casing 11, a resilient ring 19 encompassing the plug, providing a seal between the plug and the adjacent end of the casing.

The plug 16 has a longitudinal bore 21 therethrough internally threaded at its larger diameter outer end 22.

The inner end of the bore 21 is substantially conical in cross section as at 23, tapering outwardly as shown to define the main portion of a valve seat and a relatively thin annular portion 24 protrudes from the main portion of the valve seat, the main portion 23 and the annular portion 24 having a uniform internal cone angle.

The bore 12 of the casing is of reduced diameter between its ends as at 27, to define an annular shoulder 28, the inner periphery of which has a thin annular protruding portion 29. Slidably mounted in the reduced diameter portion 27 of bore 12 is the larger diameter end 31 of a valve member or plunger 32, said end 31 also having a thin annular protruding portion 33, the lip 34 of which may engage the reduced diameter portion 27 of bore 12 as well as the portion 29.

As is shown in FIG. 2, the annular portion 33 is normally inclined outwardly so that its lip 34 may snugly engage the reduced diameter portion 27 and the portion 29.

The outer end 37 of the valve member 32 defines the valve head and has a main portion 38 which is substantially conical in cross section and a relatively thin annular portion 39, which also is substantially conical in cross section, protrudes from the main portion 38, the outer cone angle of the main portion 38 being greater than that of the annular portion 39.

The valve member 32 has an axial recess 41 in its end 31 in which is seated one end of a coil spring 42, the other end of the spring being seated in a recess 43 in a plug 44 screwed into the threaded portion 45 of bore 12, the plug having a passageway or vent 46 therethrough.

Thus by rotation of plug 44, the tension of spring 42 may be adjusted as desired to set the operating pressure of the valve, and a lock nut 47 encompassing the plug 44 retains the latter in adjusted position.

To assemble the valve the valve member 32 is first inserted into the bore 12 through the end 18 of the casing 11 so that the end 31 thereof is in the reduced diameter portion 27. As a result, the annular portion 33 will be cammed inwardly so that its lip 34 will snugly engage the portion 27. The plug 16 is then inserted into the bore 12 through end 18 of the casing and securely tightened. Thereupon the spring 42 is positioned in the recess 41 and the plug 44 screwed into the bore 12 and locked in position by lock nut 47.

In operation of the unit, the bore 13 is connected to a hydraulic line and the end 22 of bore 21 of plug 16 is connected to a return line to a fluid reservoir. The unit thus connected functions as a relief valve to dump fluid from the hydraulic line, when the pressure therein exceeds a predetermined amount determined by the tension of coil spring 42 as set by plug 44.

Thus the fluid under pressure applied to the chamber C in communication with bore 13 will react against the end 31 and the inclined portion 32' of the valve member as well as against the valve head. As the surface area of the end 31 and inclined portion 32' subjected to the fluid pressure is greater than that of the valve head, the valve member 32 would normally move to valve open position. However, by reason of the coil spring 42 which urges the valve member to closed position, the valve will remain in such closed position until the pressure reaches a predetermined amount.

With the valve head in closed position shown, the surfaces of the relatively thin annular portions 24, 39 and 29, 33 exposed to the fluid in the chamber C will be subjected to a much higher pressure than the surfaces of said annular portions exposed to the fluid pressure in bore portion 21 and the portion 12' of bore 12 between the end 31 of valve member 32 and plug 44, as both bore portion 21 and the portion 12' are at substantially atmospheric pressure.

As a result, the thin annular portions 24, 39 of the valve seat and valve head, and 29, 33 of the sliding seal will be urged toward each other slightly deflecting or deforming such thin annular portions so that they are in continuous contact to provide a highly dependable seal with assurance against leakage.

Even if the valve unit should be subjected to high temperatures, which might cause deformation of the metal, by reason of the flexibility of the thin annular portions, upon application of pressure thereto, as above described, they will be pressed tightly together for effective sealing action and the greater the pressure the more dependable the seal.

As the chamber C, which is subjected to the high pressure when the valve is closed, is effectively sealed regardless of temperature or pressure, the valve unit is especially adaptable for use in devices such as missiles or the like, which may pass through extremes of pressure and temperature.

Since the thin annular portions are deformable to provide the dependable seal above noted, extremely close tolerances in the manufacture of the valve head and valve seat, and of the sliding seal, are not required, reducing the cost of the unit. Also, slight wear due to fluid flow will be compensated by reason of the deflection of the thin annular portions.

As many changes could be made in the above unit, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. As an article of manufacture a relief valve comprising a casing having a longitudinal bore therethrough and a transverse bore leading into the longitudinal bore, a substantially conical valve seat in one end of the longitudinal bore, said valve seat having a main body portion and a relatively thin deflectable annular portion protruding from said body portion and integral therewith, a plunger in said bore, said plunger having a cylindrical portion at one end and a valve head at the other, the portion of said longitudinal bore aligned with the portion of said plunger between the cylindrical portion and the valve head defining a chamber in communication with said transverse bore, the surface area of the cylindrical portion exposed to fluid pressure in said chamber being greater than that of the valve head, said longitudinal bore having a cylindrical portion slidingly mounting the cylindrical portion of the plunger, said valve head having a conical body portion complementary to the body portion of said valve seat and a relatively thin deflectable annular portion thereof extending beyond the body portion, said annular portion having a lip at its free edge adapted to engage said thin annular portion of the valve seat to form a seal, the region of said annular portion of said valve head between the lip thereof and the body portion being normally spaced from the valve seat prior to application of pressure, and resilient means in said longitudinal bore reaching beyond said plunger normally, to urge the valve head against said seat.

2. The combination set forth in claim 1 in which said resilient means is a coil spring and means are provided to adjust the tension of said coil spring.

3. The combination set forth in claim 1 in which the cylindrical portion of the plunger has a relatively thin annular portion protruding therefrom toward the chamber, said annular portion having a lip at its free edge adapted to engage the cylindrical portion of the longitudinal bore to provide a seal, the region of said annular portion between the lip and the body portion being normally spaced from the cylindrical portion of the longitudinal bore prior to application of pressure.

4. The combination set forth in claim 1 in which said resilient means is a coil spring, a plug is screwed in the end of the longitudinal bore remote from the valve seat, said coil spring being compressed between the plunger and the plug.

5. A valve having a passageway for flow of fluid, one end of said passageway defining a substantially conical valve seat having a main body portion and a relatively thin deflectable annular portion protruding from the body portion and integral therewith, a substantially conical valve head having a body portion complementary to the body portion of the valve seat and a relatively thin deflectable annular portion extending beyond said body portion and integral therewith, each of said annular portions defining a lip at their free edges, said lips being adapted to engage to form a seal, the regions of said thin annular portions between their lips and their body portions being normally spaced prior to application of pressure to the valve.

6. The combination set forth in claim 5 in which the body portion of said valve seat and the associated thin annular portion have the same internal cone angle, and the outer cone angle of the body portion of the valve head is greater than that of the associated thin annular portion.

References Cited in the file of this patent

UNITED STATES PATENTS

| | | |
|---|---|---|
| 1,514,233 | Searles et al. | Nov. 4, 1924 |
| 2,163,472 | Shimer | June 20, 1939 |
| 2,170,588 | Douglass | Aug. 22, 1939 |
| 2,330,881 | Gora | Oct. 5, 1943 |
| 2,567,391 | Mead | Sept. 11, 1951 |
| 2,899,973 | Carlson | Aug. 18, 1959 |

FOREIGN PATENTS

| | | |
|---|---|---|
| 12,155 | Australia | July 16, 1928 |
| 144,437 | Australia | Dec. 10, 1951 |
| 759,178 | Great Britain | Oct. 17, 1956 |